United States Patent
Schmitt (10) Patent No.: US 6,533,532 B1
(45) Date of Patent: Mar. 18, 2003

(54) CARRYING APPARATUS

(76) Inventor: Thomas Schmitt, 2003 Aldrich Ave. S., No. 207, Minneapolis, MN (US) 55405

(*) Notice: Subject to any disclaimer, the term of this patent is extended or adjusted under 35 U.S.C. 154(b) by 0 days.

(21) Appl. No.: 09/825,477

(22) Filed: Apr. 3, 2001

(51) Int. Cl.$^7$ ................................. B62B 1/06
(52) U.S. Cl. .............. 414/787; 414/444; 414/592; 414/787
(58) Field of Search ............... 414/444, 592, 414/787; 224/153, 262

(56) References Cited

U.S. PATENT DOCUMENTS

| | | | |
|---|---|---|---|
| 2,262,918 A | 11/1941 | Brown | |
| 3,582,043 A | 6/1971 | Tranchero | |
| 3,672,634 A | 6/1972 | Chaffin | |
| 4,034,878 A | * 7/1977 | Fox | 187/233 |
| 4,134,190 A | 1/1979 | Leathem et al. | |
| 4,368,835 A | * 1/1983 | Murphy | 224/153 |
| 4,448,434 A | * 5/1984 | Anderson | 224/915 |
| 4,561,578 A | * 12/1985 | Bell | 224/153 |
| 4,565,382 A | * 1/1986 | Sherman | 108/18 |
| 4,599,035 A | 7/1986 | Goodlad et al. | |
| 4,729,711 A | 3/1988 | Holopainen | |
| 4,759,578 A | 7/1988 | Gonzlez | |
| 4,867,277 A | 9/1989 | Sloan | |
| 5,017,080 A | 5/1991 | Thorndike et al. | |
| 5,040,637 A | * 8/1991 | Hawk | 187/206 |
| 5,114,165 A | 5/1992 | Vogel | |
| 5,127,693 A | 7/1992 | Pruit | |
| D346,255 S | * 4/1994 | Francis et al. | D34/31 |
| 5,460,307 A | * 10/1995 | Stevenson | 224/153 |
| 5,555,740 A | * 9/1996 | Stevenson | 417/234 |
| 5,645,272 A | * 7/1997 | Brennan, Sr. | 269/68 |
| 5,649,608 A | 7/1997 | Sakakibara | |
| 5,772,183 A | 6/1998 | Sears | |
| 5,848,668 A | 12/1998 | Kafrissen et al. | |
| D406,942 S | * 3/1999 | Santore | D3/216 |
| 5,975,826 A | 11/1999 | Scholder | |
| 6,047,983 A | 4/2000 | Day, III | |
| 6,095,745 A | 8/2000 | Garnett | |
| 6,269,676 B1 | * 8/2001 | Soyk | 72/457 |
| 6,286,812 B1 | * 9/2001 | Cherry | 254/122 |

* cited by examiner

Primary Examiner—Kathy Matecki
Assistant Examiner—Charles Fox
(74) Attorney, Agent, or Firm—Haugen Law Firm PLLP (57) ABSTRACT

An object-carrying system for facilitating object transportation over various ground or floor surfaces includes a transport frame and a hoist means, which transport frame is adapted to be carried by a user such that articles loaded onto such frame may be easily transported. In a particular embodiment, the transport frame may be removably attachable to an object-carrying means for improved transportation of such object-carrying means over various ground or floor surfaces.

49 Claims, 5 Drawing Sheets

CARRYING APPARATUS

FIELD OF THE INVENTION

The present invention relates to object-carrying systems generally, and more particularly to integrated multi-component systems for facilitating object transportation over various ground or floor surfaces. This invention also relates to methods for transporting objects.

BACKGROUND OF THE INVENTION

A variety of object-carrying devices have been proposed and utilized to date. Such devices are most commonly used for assisting users in manually transporting items such as boxes, furniture, appliances and other objects. The various object-carrying devices that have been proposed to date attempt to facilitate a user in manually hauling objects.

Examples of such object-carrying devices that are commonly used include carrying straps (typically referred to as "hump straps"), manual forklifts, four-wheel carts, and two or four wheel hand trucks. The conventional object-carrying devices described above introduce particular utilities for certain object transportation applications. Hump straps have commonly been used to assist in carrying various objects by increasing the potential leverage provided by the user's back. Hand trucks, push carts, and the like have traditionally been utilized to assist in handling relatively larger or heavier objects by allowing the user to simply push or pull the devices over relatively flat ground or floor surfaces to transport the objects.

Though such object-carrying devices have obtained relative popularity, drawbacks exist for each category of such devices. For example, conventional hand trucks find difficulty when faced with irregular ground or floor surfaces such as stairs or the like. Hump straps can result in awkward and potentially harmful lifting positions for the users, as well as creating imbalanced weight distribution with respect to the carrying user. Such imbalanced loads can result in difficulty and/or potential injury for the user. Therefore, conventional object-carrying devices are unsuitable for transporting various loads over a variety of ground and/or floor surfaces.

More recently, attempts have been made to overcome such drawbacks by modifying the object-carrying devices, and in particular modifying conventional hand trucks. Several modifications have been proposed which add a lifting capability to conventional hand trucks for either manually or automatically raising the payload above a ground surface. Other proposed modifications provide mechanical techniques for transporting the conventional hand trucks over uneven surfaces, such as stairs. A particular example of such a device is shown in Jeavons (U.S. Pat. No. 5,829,763), wherein a motorized extension device operably raises the hand truck such that the wheels of the hand truck may be placed upon an elevated surface, i.e. a step in a staircase. The process may also be reversed for descending the hand truck from elevated surfaces. Such a device, however, is an inadequate solution, in that the elevating device must be alternatively extended and retracted for each ground or floor surface level change which can be extremely time consuming. In addition, the extension device requires a relatively flat surface to support the force of raising or lowering the loaded hand truck. In addition, such modifications to conventional hand trucks add significant weight thereby further frustrating an overall purpose of providing a system or device for easily transporting various objects.

Another drawback of object-carrying devices in use today is the overall bulkiness associated therewith. In many situations, standard devices are not only difficult to transport themselves, but also are difficult to maneuver in relatively compact work areas. Thus, a need exists in the art for a system capable of assisting a user in transporting objects over various ground or floor surfaces while retaining preferred characteristics such as portability and low weight. Furthermore, a need exists in the art for a portable system that is efficient in transporting various objects in a variety of work environments.

Accordingly, it is a principle object of the present invention to provide a means for efficiently transporting various objects over a variety of ground or floor surfaces.

A further object of the present invention is to provide a portable system for efficiently transporting various objects over a variety of ground or floor surfaces.

A still further object of the present invention is to provide a hand-carryable, multi-component system for assisting a user in efficiently transporting various objects over a variety of ground or floor surfaces.

A yet further object of the present invention is to provide compactable components forming a system for assisting a user in efficiently transporting various objects over a variety of ground or floor surfaces.

Another object of the present invention is to provide a lightweight, compactable object-carrying means.

A further object of the present invention is to provide a distinct and portable hoist means for raising and lowering various objects, including object-carrying devices.

A yet further object of the present invention is to provide a distinct and portable hoist means being activatable by a ratcheted foot lever.

A still further object of the present invention is to provide a yoke means for removable attachment to an object-carrying means.

It is another object of the present invention to provide a yoke means that is configured to be worn by a user and removably attachable to an object-carrying means, such that the attached object-carrying means may be transported by the user over a variety of ground or floor surfaces.

A still further object of the present invention is to provide a yoke means having manually actuatable extension legs such that a payload being carried by a user may be efficiently lowered to a ground or floor surface.

It is a yet further object of the present invention to provide a manual actuating means for actuating a lowering mechanism to lower an object-carrying means with respect to the yoke means.

SUMMARY OF THE INVENTION

By way of the present invention, a means for efficiently and conveniently transporting articles over various ground or floor surfaces is provided. Such an article-carrying means is provided by a multi-component portable system comprising a hoist means, a movable article-carrying means, and a yoke means which is removably attachable to the article-carrying means such that a user may "wear" the yoke means, and carry the combined yoke means/article-carrying means over various ground or floor surfaces. A particular advantage achieved through the present invention is the ability for a user to wear such a yoke means and removably attach loaded article-carrying means thereto to manually transport the payload to desired locations.

One embodiment of the transporting system includes a movable object-carrying means, a hoist means for lifting and lowering the object-carrying means to desired heights, and a yoke means for removable attachment to the object-carrying means, wherein the yoke means comprises a user-wearable device that is configured to be efficiently carried by a user such that object held on the removably attachable object-carrying means may be easily transported over various ground and floor surfaces. Desired aspects of such an embodiment include lightweight and compactable characteristics of each of the distinct components. Further, the object-carrying means preferably includes an upright frame having an upper portion and a lower portion, the lower portion including a support shelf that is pivotally mounted thereto such that the support shelf may pivot 90 degrees between a parallel and a perpendicular orientation with respect to the frame, and the lower portion including one or more movement facilitators rotatably secured thereto for facilitating movement of the object-carrying means. One of the upper portion and the lower portion may be telescopingly received in a respective other portion such that a respective height dimension of the object-carrying means may be correspondingly adjusted.

The hoist means of the above-described embodiment referably comprises a lift portion and a stationary portion, the stationary portion remaining substantially adjacent to a respective ground or floor surface upon which the hoist means rests. To raise and lower the lift portion of the hoist means, a ratcheted foot lever may be actuated by a user positioned on the stationary portion of the hoist means. Preferably, a lift system release mechanism is provided in a hoist means, which release mechanism may be actuated by a user positioned upon the stationary portion of the hoist means.

The yoke means in the embodiment described above is preferably slidably and lockingly engageable with the object-carrying means. Furthermore, yoke handles are preferably pivotally connected to a frame portion of the yoke means, wherein the yoke handles are configured to be supported by respective shoulders of a user when the yoke handles are pivotally extended outwardly from the yoke frame portion. As a particular feature of the yoke means described above, the yoke handles preferably include first and second actuating means disposed on the yoke handles in a location convenient to the user when the yoke means is being "worn" by the user. The first actuating means may be activated to release the object-carrying means from removable attachment to the yoke means, thereby allowing a biasing means to slidably extend the object-carrying means downwardly with respect to the yoke means from a stowage position to an engagement/disengagement position, which is at or near the ground or floor surface. The yoke means also preferably includes retractable support legs which may be actuated by the second actuating means to be extended downwardly from a locked retracted position to an unlocked extended position. The second actuating means allow a second biasing means to bias the support legs toward the extended position. Another embodiment of the carrying-apparatus of the present invention provides for a user-wearable, article-carrying device having a frame and grasping handles pivotally connected to the frame, wherein the handles are configured to be placed over respective shoulders of a user such that the frame may be supported by the user, and thereafter carried to desired locations. The portable apparatus of this embodiment also includes a hoist means similar to the hoist means described in the previous embodiment.

An additional embodiment of the invention provides for a portable hoist means for raising and lowering articles to desired levels. The hoist means preferably includes a lift portion, a stationary portion substantially adjacent to the lift portion, one or more ramp portions pivotally connected to the hoist means, wherein the ramp portions are pivotally extendable to extend between an upper surface of the hoist means and a respective ground or floor surface. Hoist means further includes a lift system operably connected to the lift portion, wherein the lift system includes means for operably raising and lowering the lift portion to desired levels. In preferred embodiments, the hoist means comprises a pantographic lift system.

Another embodiment of the invention provides for a portable article-transporting device having an elongated frame, a plurality of extendable support legs which are extendable outwardly from the frame, a biasing means which are braced against the frame, and a support harness pivotally connected to the frame, wherein the harness includes a plurality of grasping handles which include a first actuation means for remotely actuating the extendable support legs by remotely releasing the biasing means to operably extend the support legs. The portable article-transporting device of such an embodiment is preferably adapted to be removably attachable to common hand trucks.

The present invention also contemplates a method of transporting articles over various ground or floor surfaces. The method includes providing a movable object-carrying means, a hoist means for lifting and lowering the object-carrying means to desired heights, and a yoke means for removable attachment to the object-carrying means, the yoke means including a user-wearable device being configured to be efficiently carried by a user such that objects held on the removably attached object-carrying means may be easily transported over various ground and floor surfaces. The method provides for loading articles upon the object-carrying device, and subsequently maneuvering the loaded object-carrying device to a lift portion of the hoist means. A user may then removably attach the yoke means to the object-carrying device, and raise the combined yoke means/object-carrying means to a desired height via the hoist means. The user may then support the combined yoke means/object-carrying means on their shoulders, and subsequently transport the loaded article to desired locations.

DETAILED DESCRIPTION OF THE PREFERRED EMBODIMENTS

The objects and advantages enumerated above together with other objects, features and advances represented by the present invention will now be presented in terms of detailed embodiments described with reference to the attached drawing figures which are intended to be representative of various possible configurations of the invention. Other embodiments and aspects of the invention are recognized as being within the grasp of those having ordinary skill in the art.

Figure 1:
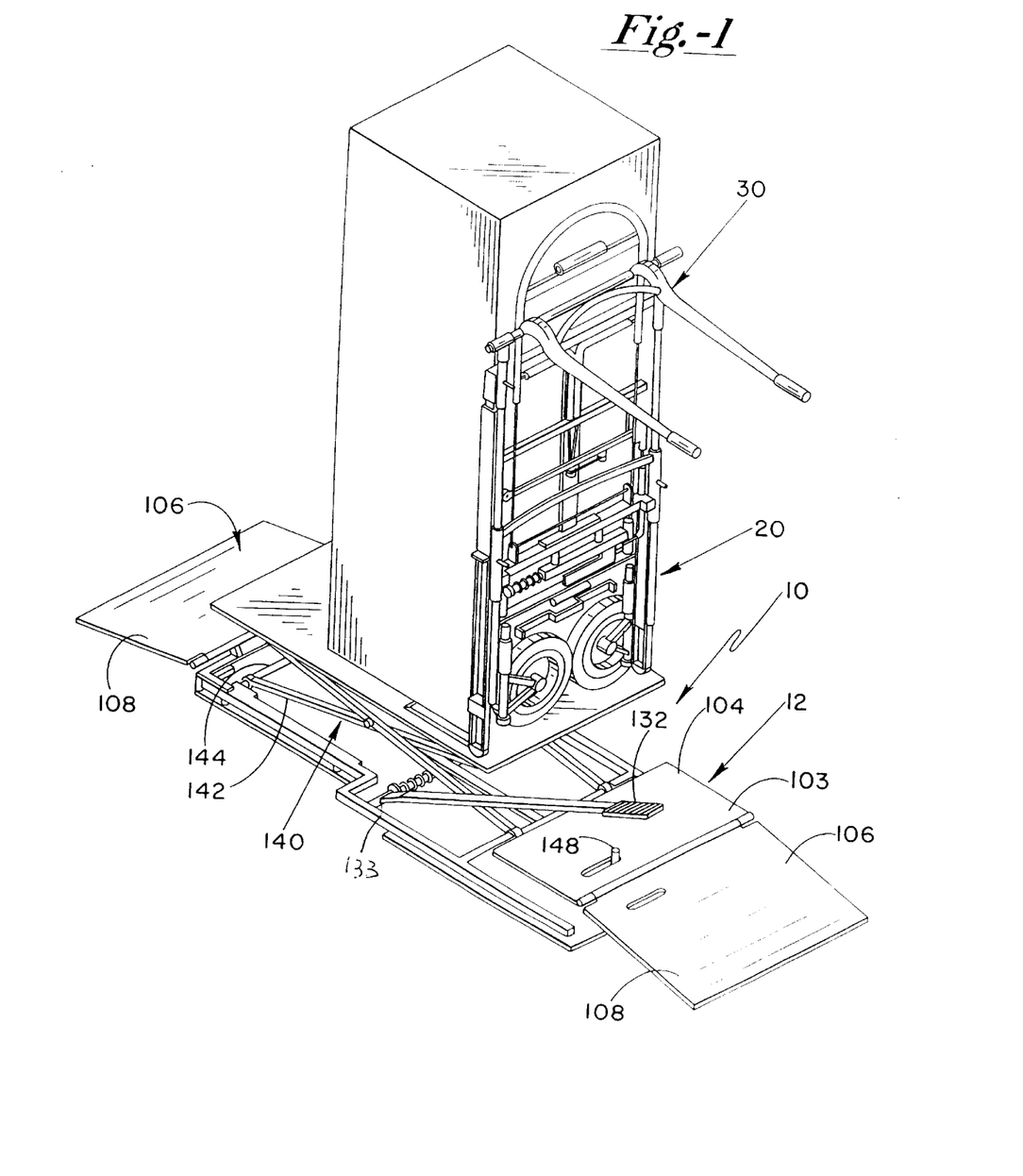
FIG. 1 is a perspective view showing the components of the present invention.

Referring now by characters of reference to the drawings, and first to FIG. 1, an object-transporting system 10 is shown. System 10 preferably comprises a portable hoist means 12, a movable object-carrying means 20, and a yoke means 30, each of which are preferably distinct components and which are adapted to operate in conjunction with one another. As shown in FIG. 1, object-carrying means 20 and yoke means 30, in combination, are sized and configured to be lifted by hoist means 12.

Figure 2:
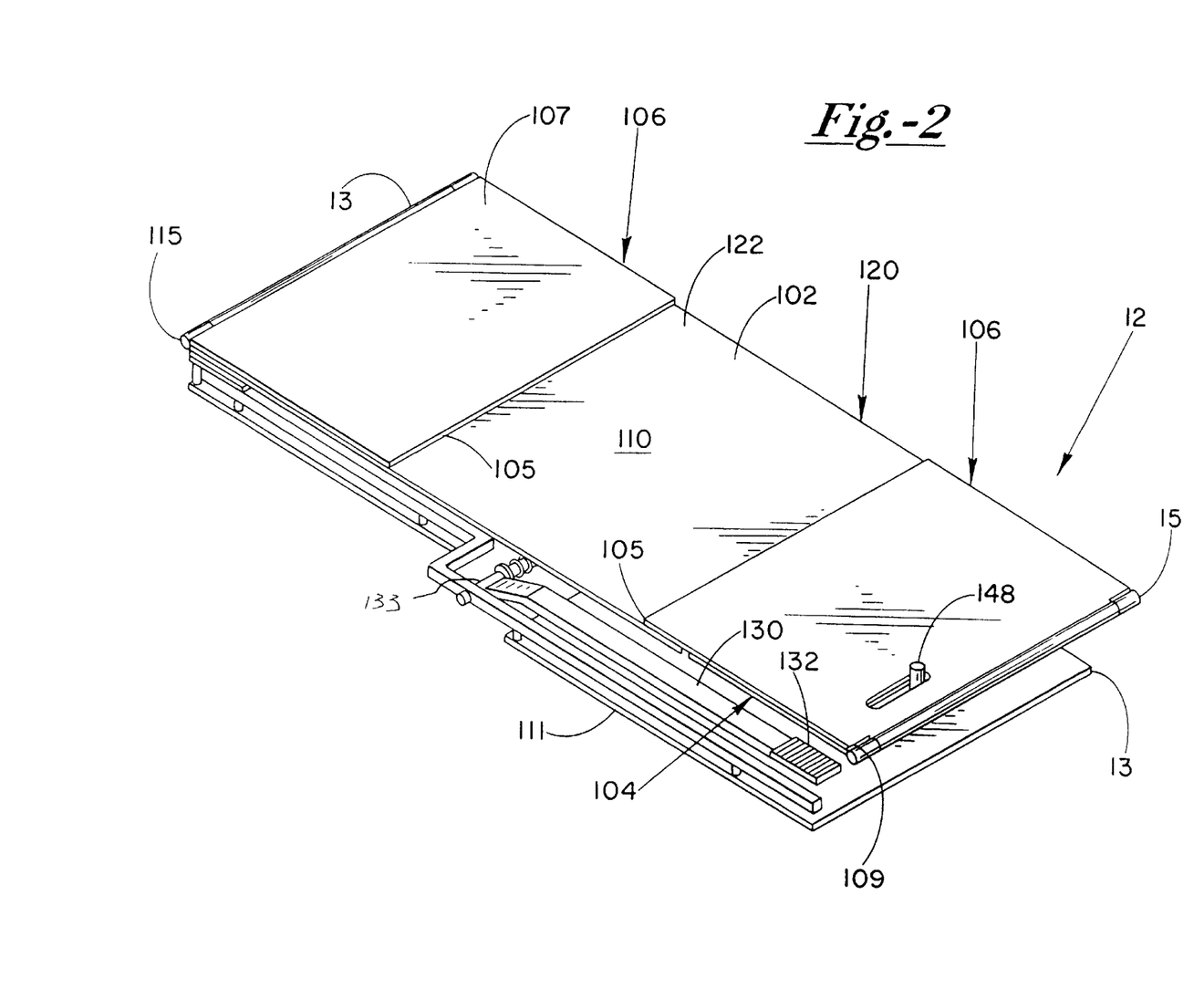
FIG. 2 is a perspective view showing the hoist means of the present invention.

As shown in FIG. 2, hoist means 12 embodies a substantially flat platform when in a first retracted position. Preferably, hoist means 12 includes a lift portion 102 and at least one stationary portion 104. Furthermore, hoist means 12 preferably includes one or more ramp portions 106 which may be pivotally rotated about respective pivot axes 115. Ramp portions 106 are shown in FIG. 2 in closed orientation, and are shown in FIG. 1 in an open orientation. When in the open orientation, ramp portions 106 preferably extend between an associated ground or floor surface to an upper surface 110 of hoist means 12. In other words, hoist means 12 includes an upper surface 110 and a generally opposing lower surface 111, which lower surface 111 is typically in face-to-face relationship with the respective ground or floor surface, and such ramp portions 106 preferably extend between the ground or floor surface and upper surface 110 of hoist means 12. Upper surface 110 of hoist means 12 is defined as a substantially continuous surface when hoist means 12 is in a retracted position, and comprises respective surfaces of lift portion 102, stationary portion 104, and ramp portions 106 when such ramp portions are in a closed orientation.

In preferred embodiments of the present invention, ramp portions 106 are pivotally secured to hoist means 12, but are distinct from stationary portion 104, in that stationary portion 104 is disposed below respective ramp portion 106 when ramp portion 106 is in the closed orientation. An example of such an embodiment is shown in FIG. 1, wherein ramp portions 106 are pivotally rotated from the closed transport orientation as shown in FIG. 2, to an open operating position as shown in FIG. 1, whereby ramp portion 106 extends between the ground or floor surface and stationary portion 104.

In some embodiments, ramp portions 106 may be slidably or otherwise secured to hoist means 12. In such a slidable arrangement, ramp portions 106 are slidably extended outwardly until respective proximal edges 109 of ramp portions 106 are engaged by grasping means (not shown), whereby ramp portions 106 are allowed to pivot downwardly until distal edges 105 of ramp portions 106 come in contact with the ground or floor surface. Other means for extendably positioning ramp portions 106 into the open operating position are contemplated by the present invention, so long as the overarching goal of obtaining a portable and compactable hoist means is achieved.

As referred to above, a particular advantage of the hoist means 12 described herein is its portability and compactability so as to be easily transported as part of an object-carrying system. Thus, hoist means 12 is preferably fabricated from a relatively lightweight but strong material, such as aluminum, titanium, or the like. A variety of materials are contemplated as being utilized for the present invention for weight savings and/or component strengthening characteristics. Such portable, lightweight, and compactable/extendable characteristics of hoist means 12 is an important aspect of the present invention which provides advantages not found in typical systems in use today.

In a particularly preferred embodiment of the present invention, upper surface 110 of hoist means 12, when the hoist means 12 is in the closed and retracted position (FIG. 2), comprises, in combination, respective first surfaces 107 of folded ramp portions 106, upper surface 122 of lift portion 120, and upper surface 103 of stationary portion 104. Hoist means 12 may be placed in an operating position by pivotally rotating ramp portions 106 about their respective pivot axes 115 such that first surface 107 of respective ramp portions 106 is rotated in orientation such that surface 107 is disposed toward the ground or floor surface. As shown in FIG. 1, second surface 108 of respective ramp portions 106 substantially faces upwardly when hoist means 12 is in the operating position. As further shown in FIG. 1, at least one of the ramp portions preferably extends between the ground or floor surface and stationary portion 104.

Hoist means 12 preferably further includes a lift lever 130, which lift lever 130 may be operably actuated to vertically raise lift portion 120. Preferably, lift lever 130 actuates a pantographic lift system 140, as illustrated in FIG. 1. Such a pantographic lift system is well known in the art, and has several advantages useful in the present invention. Other lift systems, however, are also contemplated by the present invention, so long as convenient manual or automatic means may be actuated to efficiently raise loads placed upon upper surface 122 of lift portion 120. Most preferably, lift lever 130 is operably coupled to a ratchet means 133, whereby pantographic lift system 140 may be raised through a ratcheted lift technique.

In a particular embodiment, lift lever 130 is spring biased and pivotally coupled to the pantographic system 140. Biasing force upon lift lever 130 is developed by residual force on lift supports 142 of pantographic lift means 140, which residual force is caused by downward gravitational force on lift portion 120. Such gravitational force on lift portion 120 acts to push support legs 142 outwardly toward distal ends 13 of hoist means 12, thereby energizing biasing means (not shown). Preferably, such energized biasing means act to pivotally rotate lift lever 130 upwardly to a fixed stop point, which stop point is preferably between 10 degrees and 45 degrees from horizontal.

In operation, lift lever 130 may be operated by a foot of a user standing upon stationary portion 104. Downward force upon foot pad 132 of lift lever 130 correspondingly acts to force respective support legs 142 inwardly, thereby vertically raising lift portion 120 via pantographic lift system 140. In preferred embodiments, lift lever 130 is operably coupled to pantographic lift system 140 via a ratcheting means 133 such that pantographic lift means 140 is restrained from retracting under the downward force of gravity at predetermined and desired lift intervals. Such ratcheting means 133 provides an efficient technique for lifting payloads upon lift portion 120, as well as retaining pantographic lift system 140 in incremental extended orientations. By way of example, lift lever 130 is typically pivotally rotated to a stop point via the biasing means. Subsequently, a user may actuate lift system 140 by pressing downward on foot pad 132 of lift lever 130, such that lift lever 130 pivots downwardly from the stop point. Preferably, a plurality of ratchet intervals exist between the stop point and a horizontal (zero degrees) angle. Each such ratchet interval correspondingly moves lift system 140 such that lift portion 120 is raised accordingly.

In further aspects of hoist means 12, lift lever 130 may be operably coupled to pantographic lift system 140 via one or more torque-reducing gear assemblies, such that the rotational distance that lever 130 is moved by the user does not unitarily correspond with the lateral distance moved by support legs 142 of lift system 140. In such a manner, resultant resisting upward force on lift lever 130 may be less than the downward gravitational force exerted upon lift system 140. Thus, relatively heavy payloads placed upon lift portion 120 may be easily lifted through foot actuation by the user upon lift lever 130.

Hoist means 12 preferably further includes a locking mechanism (not shown) for lockingly engaging lift system 140 at desired intervals to prevent lift system 140 from undesirably retracting due to the gravitational force upon lift portion 120. Such a locking mechanism forms a brace extending between a respective distal end 144 of support legs 142 and a fixed portion of hoist means 12. Thus, the locking mechanism comprises a protuberance which engages lift system 140 at predetermined ratchet intervals. Such a protuberance is preferably operably retracted via a remote unlocking means 148, which is illustrated in FIG. 2 as being accessible through upper surface 103 of stationary portion 104. In preferred embodiments of the present invention, unlocking means 148 may be laterally displaced to correspondingly retract the locking protuberance, thereby allowing lifting system 140 to retract under a downward force of gravity placed upon lift portion 120. It is contemplated by the present invention, however, that unlocking means 148 may be actuated by any number of convenient actuation techniques that are readily accessible to a user standing upon stationary portion 104. In such cases which unlocking means 148 protrudes above upper surface 103 of stationary portion 104, a corresponding aperture in pivoting ramp portion 106 is likewise provided such that unlocking means 148 may extend therethrough when ramp portions 106 are positioned in a closed orientation.

Figure 3:
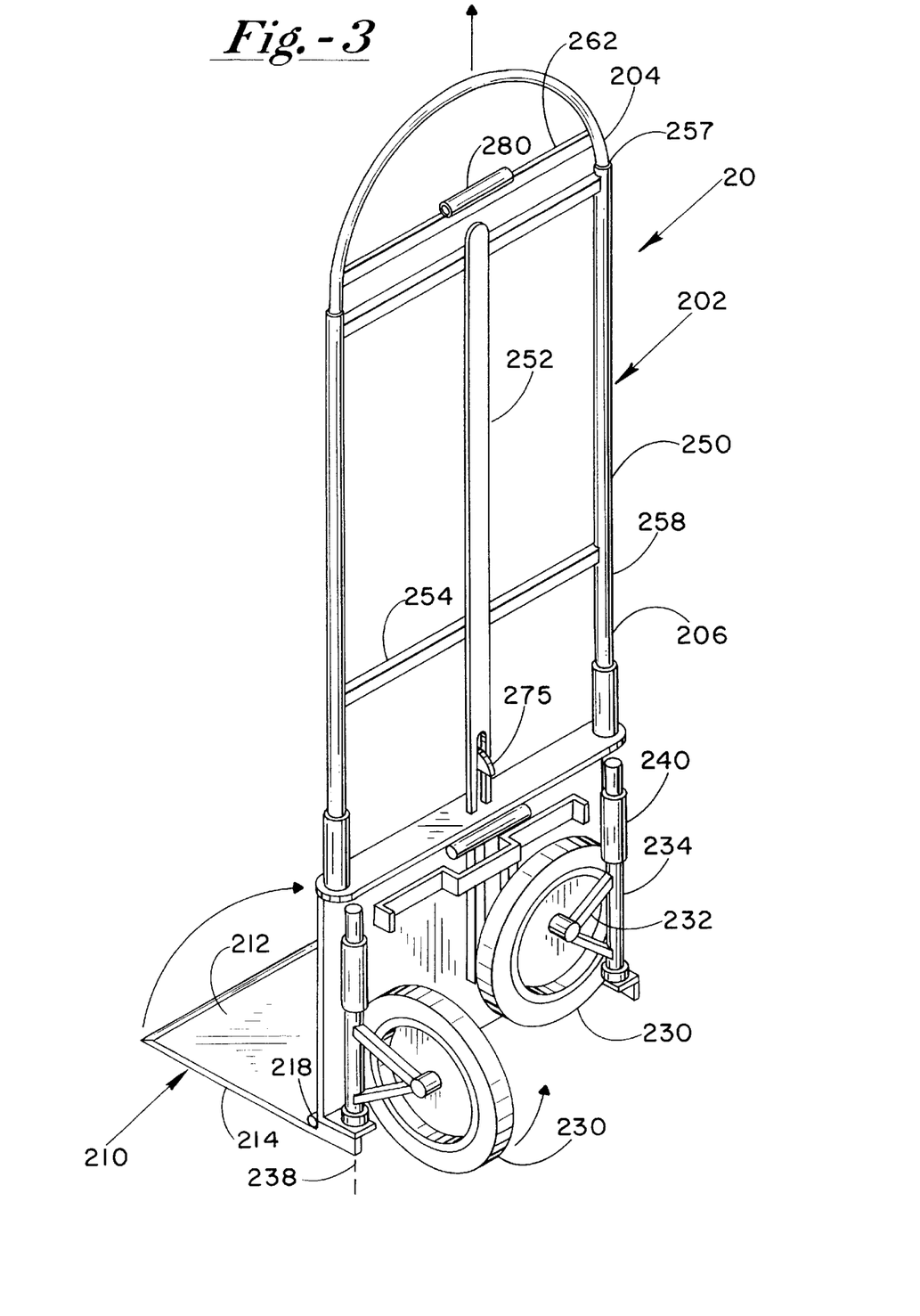
FIG. 3 is a perspective view showing an object-carrying means of the present invention.

An object-carrying means 20 of the present invention is illustrated in FIG. 3. object-carrying means 20 includes an elongated frame 202 having an upper portion 204 and a lower portion 206. Lower portion 206 of frame 202 preferably includes a support shelf 210 attached thereto. Support shelf 210 is preferably pivotally attached to lower portion 206 of frame 202 such that shelf 210 may pivot 90 degrees between a horizontal and a vertical orientation. Shelf 210 has an upper surface 212 and a generally opposing lower surface 214, which upper surface 212 is preferably placed in face-to-face relationship with frame 202 when shelf 210 is pivotally moved into a vertical orientation.

Lower portion 206 includes pivotal securing means 218 which is sized and configured to receive shelf 210 therein. Securing means 218 provides pivotal movement of shelf 210 between a horizontal (zero degrees) orientation to a substantially vertical (90 degrees) orientation. In some embodiments of the present invention, a locking means (not shown) may be provided for selectively locking shelf 210 in either the horizontal or vertical orientation. Such a pivoting means is provided in the present invention for related portability and compactability characteristics. In addition, pivoting support shelf 210 into face-to-face relationship with frame 202 provides an advantage of desirable stowage characteristics, as is discussed herein.

In preferred embodiments, lower portion 206 further includes one or more movement facilitators 230 secured to moving object-carrying means 20. Such movement facilitators may include, for example, wheels, tracks, or rollers, or any other rotatable device which aids a user in moving object-carrying means 20. Preferably, such movement facilitators are wheels, which may include pneumatic tires.

Wheels 230 are preferably connected to lower portion 206 of frame 202 via pivot arms 232, which pivot arms 232 are connected to pivot posts 234. Pivot posts 234 allow limited pivoting motion for wheels 230. In some embodiments, wheels 230 may pivot along a substantially vertical axis, as designated at 238 between an extended operating position and a retracted stowage position (which stowage position is illustrated in FIG. 3). Preferably, pivot posts 234 provide about 90 degrees of pivotal rotation for wheels 230 to selectively pivot between the extended position and the closed position. In some embodiments of the present invention, locking means (not shown) are provided in respective pivoting cylinders 240, in which pivoting cylinders 240 pivot posts 234 pivot. Such locking means may be selectively engageable with pivot posts 234 such that wheels 230 may be held in place in either the extended position or the closed position.

Wheels 230 are preferably provided with pivoting means to facilitate the portability and compactability objectives of the present invention. Furthermore, wheels 230 may be pivoted inwardly into the closed position for desired conjunctory uses with other system components of the present invention.

As shown in FIG. 3, frame 202 preferably includes side posts 250, a central support beam 252 therebetween, and one or more cross beams 254 extending between side posts 250. Preferably, cross beams 254 intersect with support beam 252 to provide structural strength and rigidity to frame 202. In some embodiments, side posts 250 and support beam 252 are substantially parallel, and extend in a singular plane. Other embodiments, however, provide a recessed support beam 252, whereby support beam 252 remains in parallel relationship with side posts 250 but is displaced rearwardly in the direction of extended wheels 230. In such an embodiment, cross-beams 254 preferably intersect with support beam 252, though cross beam 254 may also extend between side posts 250 without intersecting support beam 252. Such recessed embodiments provide for easier stowing and carrying characteristics for carrying non-square and other irregularly-shaped articles upon shelf 210. In preferred embodiments of the present invention, one of upper portion 204 and lower portion 206 may be telescopingly received in another of the upper portion and the lower portion such that a height dimension of frame 202 is adjustable. Preferably, upper portion 204 may be at least partially telescopingly received in lower portion 206. As such, side posts 257 of upper portion 204 have a smaller diameter than corresponding side posts 258 of lower portion 206, such that side posts 257 may be received within hollow side posts 258 to adjust the height dimension of object-carrying means 20.

Through such a telescopic functionality, the height dimension of frame 202 may be adjusted between a relative height ratio of 1:1.25 and 1:3. In such a manner, frame 202 may be adjusted to correspond with the height dimension of respective articles being carried upon shelf 210 to provide adequate support over a desired height dimension. In other words, frame 202 may be adjusted to desired height dimensions such that frame 202 provides a supporting surface to such a desired height. Furthermore, such telescopic functionality provides for desired portability and compactability characteristics for object-carrying means 20.

Object-carrying means 20 is preferably fabricated from a lightweight and yet strong material to provide both portability and durability characteristics. A particularly preferred material for object-carrying means 20 of the present invention is aluminum, though a variety of other materials may be utilized in the manufacture of the object-carrying means.

As an additional feature of the present invention, object-carrying means 20 may include a plurality of strap-connection means 280, which are integral with the various components of frame 202. As shown in FIG. 3 strap securement means 280 may be formed integral with a cross-beam 262 in upper portion 204. Strap securement means 280 provide convenient means for securing a payload strap (not shown) thereto. Other strap securement means 280 may be formed integrally with frame 202 at various locations, though most preferably distal to upper portion 204. In some embodiments, strap securement means located on lower portions of frame 202 may provide for permanent attachment of the payload strap thereto, while strap securement means 280 on upper portion 204 may provide for removable securement of the payload strap thereto. Thus, a user may desirably clasp articles being carried upon shelf 210 to frame 202 via the payload strap. To clasp such articles, the user wraps the payload strap around a side of the carried articles which is opposite frame 202 and subsequently removably attach such strap to strap securement means 280 positioned on upper portion 204. Such securing means allows a user to easily clasp various articles to object-carrying device 20, thereby facilitating transport of such articles.

Figure 4:
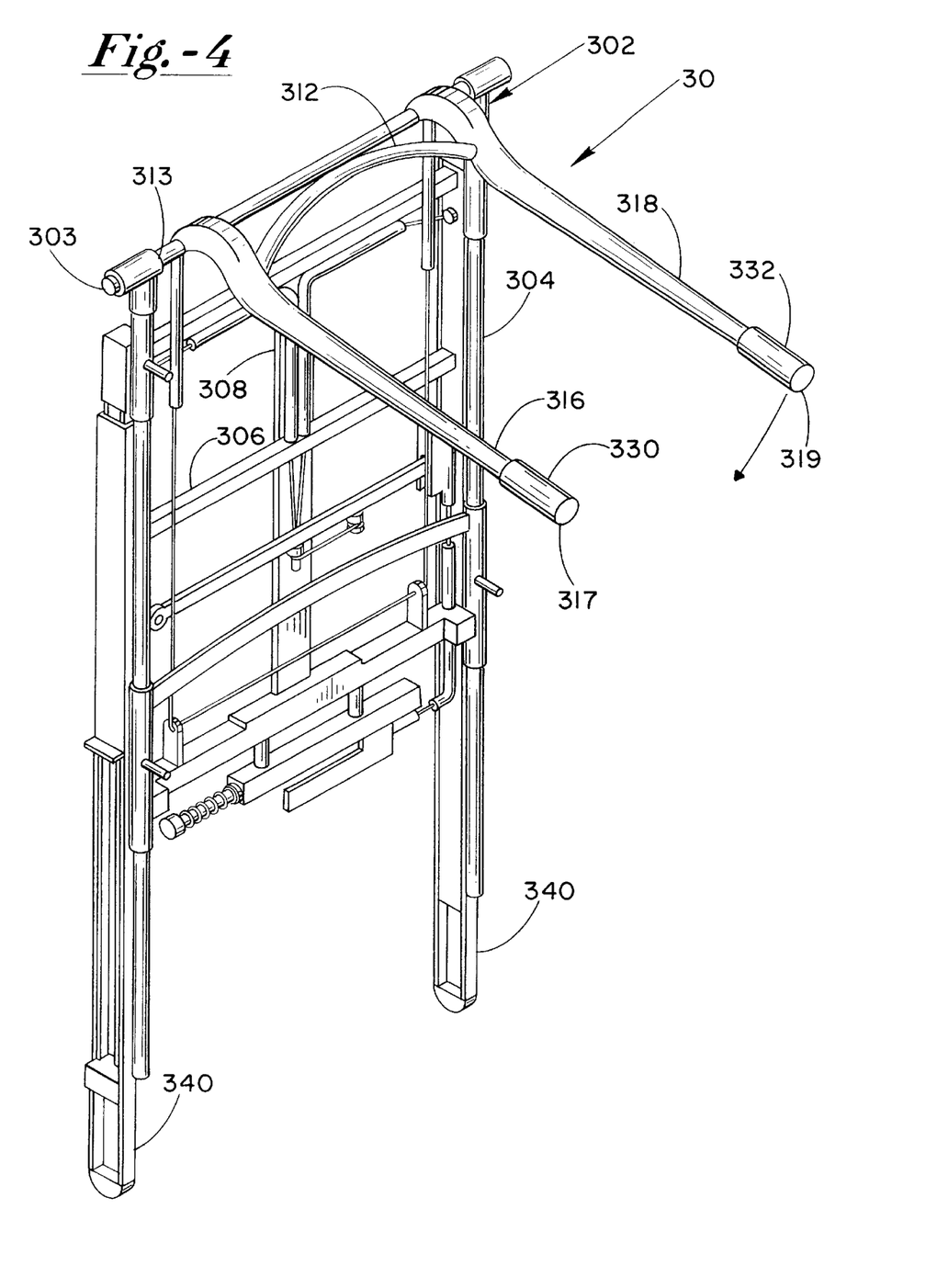
FIG. 4 is a perspective view of a yoke means of the present invention.

A yoke means 30 of the present invention is illustrated in FIG. 4. Yoke means 30 includes a support frame 302 having side members 304 and one or more cross-members 306 extending between side members 304 cross-member 306 provide structural integrity to frame 302 by forming brace means between side member 304. In preferred embodiments, a plurality of cross-members 306 are provided in yoke means 30 to create a strong and durable frame for supporting substantial weight thereon. In highly preferred embodiments, frame 302 further includes a spine member 308 which is substantially parallel to side member 304 and intersects at least two cross-members 306. Spine member 308 provides further structural integrity to frame 302.

In preferred embodiments of the present invention, yoke means 30 is removably attachable to object-carrying means 20. A variety of means for removably attaching yoke means 30 to object-carrying means 20 is contemplated by the present invention. Such removable attachment means may include, for example, clip means, slidable engagement means, mechanical locking means, or combinations thereof. Preferably, yoke means 30 is mechanically engageable with object-carrying means 20 for removable attachment thereto. Preferably, spine member 308 includes a receiving channel that is sized and configured to receive support beam 252 of object-carrying means 20. Thus, support beam 252 is slidably engaged with spine member 308 to removably attach object-carrying means 20 to yoke means 30. As shown in FIG. 3, object-carrying means 20 preferably includes a retractable tooth 275, which retractable tooth 275 acts as a locking means for holding object-carrying means 20 in an engaged position with yoke means 30. To separate object-carrying means 20 from yoke means 30, retractable tooth 275 may be remotely retracted by the user, thereby allowing object-carrying means 20 to disengage from yoke means 30. In other embodiments, protrusions may be formed integral with side posts 250 to slidably and lockingly engage with corresponding receiving means positioned on side beams 304 of yoke means 30.

In some preferred embodiments of the present invention, yoke means 30 may include clasping means which are sized and configured to mechanically clasp side posts 250 of object-carrying means 20. Such clasping means may comprise, for example, resilient clips which provide an inherent biasing force to effectively grasp object-carrying means 20. A variety of other removable attachment means may be utilized in the present invention to removably attach yoke means 30 to object-carrying means 20.

Frame 302 of yoke means 30 is preferably configured to be adaptable to a users back such that yoke means 30 may be comfortably held in close proximity to the user. Preferably, yoke means 30 includes a harness 312 pivotally connected to an upper portion 303 of frame 302. Harness 312 preferably includes first and second shoulder support arms 316, 318 extending outwardly from pivot axis 313 of harness 312. Preferably, first and second arms 316, 318 are at least six inches in length, and more preferably are between six inches and five feet in length. As shown in FIG. 6, harness 312 may be pivotally rotated away from frame 302 such that first and second arms 316, 318 extend at an angle away from frame 302. In such an orientation, a user may position their back to frame 302, with respective shoulders in supportive contact with first and second arms 316, 318. The user may then lift yoke means 30 by supporting the weight of yoke means 30 at the interface between such first and second arms 316, 318 and respective shoulders of the user.

In preferred embodiments, harness 312 has a limited pivot range between an orientation parallel with frame 302 and an angle of no greater than 90 degrees with respect to frame 302. More preferably, harness 312 are not allowed to pivot more than 80 degrees with respect to a folded position substantially in parallel with frame 302. Most preferably, harness 312 is limited in its pivot angle to 60 degrees with respect to a folded position substantially parallel to frame 302. Such a limited pivot degree is provided for desired grasping characteristics for the user. For example, a user preferably positions their shoulders adjacent to pivot axis 313 such that first and second arms 316, 318 extend at a downward angle with respect to the user's body. Thus, the user may easily grasp respective distal ends 317, 319 of first and second arms 316, 318. Such grasping allows the user to hold yoke means 30 in place with respect to his body, as well as to create a natural fulcrum for lifting payloads attached to yoke means 30. Such a fulcrum is utilized by the user by pulling distal ends 317, 319 downwardly while yoke means 30 is supported by the user's respective shoulders. A downward force upon first and second arms 316, 318 therefore results in an upward, or lifting force on yoke means 30. In use, such lifting of yoke means 30 allows the user to lift removably attached object-carrying means 20 above the ground or floor surface to transport object-carrying means over irregular surfaces. In some embodiments of the present invention, removable attachment means provided on frame 302 and frame 202 include biasing means which bias against sliding engagement between movable attachment means. For example, protrusions formed on frame 202 may be met with resistance when inserted into associated receiving means on frame 302. At a point where the protrusion is slidably engaged in the receiving means, a locking mechanism grasps the protrusion in place. To separate yoke means 30 from object-carrying means 20, the locking means is disengaged, thereby allowing the biasing means to slidably extend the object-carrying means downwardly with respect to yoke means 30 to a position where engagement/disengagement may take place.

As illustrated in FIG. 4, first and second arms 316, 318 are preferably provided with first and second actuating means 330, 332. First and second actuating means 330, 332 may be hand-actuatable by a user of yoke means 30. Preferably, first and second actuating means, 330, 332 comprise twist grips, buttons, or squeeze grips, or combinations thereof. Other actuatable devices are contemplated in the present invention for actuating various mechanical functions of yoke means 30.

In a preferred aspect of yoke means 30, extendable support legs 340 are provided, which support legs 340 are extendable from a first retracted position to a second extended position at the urging of a biasing means (not shown). Preferably, support legs 340 are disposed adjacent to side beams 304 of frame 302, and extend and retract in a plane parallel to frame 302. As shown in FIG. 4, support legs 340 preferably extend downwardly in a direction opposite of upper portion 303 of frame 302. Support legs 340 are preferably stowed in a retracted position via locking means (not shown). Support legs 340 are retracted against an expansion force of the biasing means, and are locked into a retracted position by the locking means. The locking means are preferably disengaged by actuating first actuating means 330, thereby allowing biasing means to expand and extend support legs 340 to an extended position. At such an extended position, the biasing means preferably is still in a somewhat contracted orientation such that residual downward force is placed upon support legs 340.

In preferred embodiments of the present invention, second actuation means 332 may be activated by the user to retract tooth 275, which is restraining object-carrying means 20 in a locked position. Once such locking means are released, object-carrying means 20 is allowed to descend with the force of gravity along frame 302 of yoke means 30. Most preferably, yoke means 30 includes a biasing means for absorbing the energy associated with descending object-carrying means 20 when the associated locking mechanism is released. Therefore, object-carrying means 20 descends at a controlled rate, and does not impact with the ground or floor surface with a large degree of force. Such resistive biasing means may include, for example, pneumatic or fluid-based shock absorbers, or low spring constant value springs. Such biasing means may also include resilient objects such as rubber stops.

Figure 5:
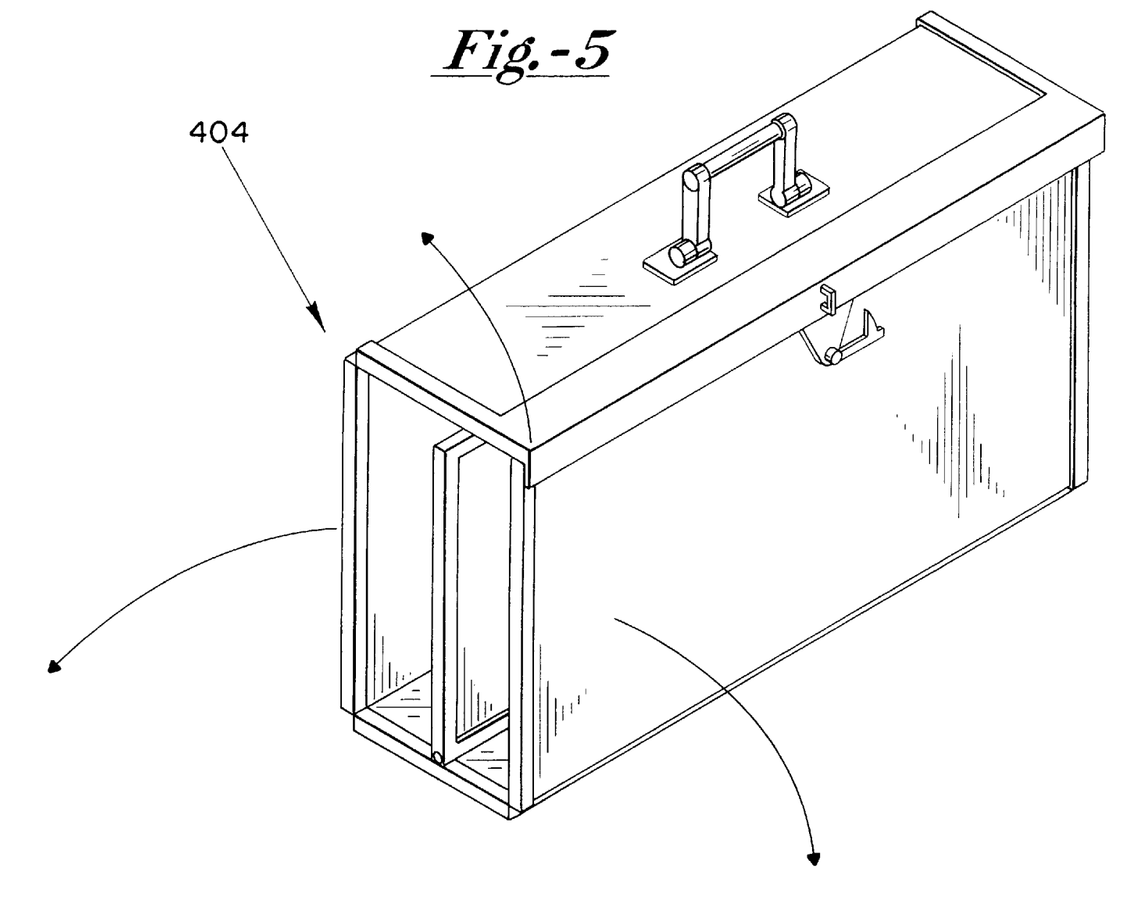
FIG. 5 illustrates an example of a hand-carryable container in which the portable system of the present invention may be stowed and transported.

In use, the components of the present invention work in concert to achieve the overarching goal of transporting various articles over irregular ground or floor surfaces. Preferably, a user may transport system 10 in a hand-carryable container, such as a suitcase or the like. Such a container 404 is shown in FIG. 5. Thus, the weight of system 10 is preferably no more than 50 pounds, and more preferably no more than 35 pounds. The portable system may, in such a way, be transported by the user to any desired location. Once at the desired location, the user may remove each of the distinct components from the hand-carryable container.

Hoist means 12 is preferably placed upon a relatively flat surface such that lift portion 102 is in a substantially horizontal orientation. Ramp portions 106 are preferably pivoted outwardly to connect upper surface 112 of hoist means 12 with the ground or floor surface. Next, the user may pivotally extend wheels 230 and support shelf 210 away from frame 202 of object-carrying means 20. The object-carrying 20 may then be positioned adjacent to various articles for transport. Such articles are preferably placed upon support shelf 210 and are secured to object-carrying means 20 via a support strap (not shown) which support strap may be removably attached to attachment means 280. The user preferably then maneuvers the loaded object-carrying means onto lift portion 102 of hoist means 12 via ramp means 106. Standing upon stationary portion 104, the user pivotally actuates lift lever 130 by pressing downwardly upon foot pad 132 until lift portion 102 has raised the loaded object-carrying means 20 to a desired height. Thereafter, the user removably attaches yoke means 30 to object-carrying means 20, and subsequently places harness 312 over his respective shoulders to lift the combined object-carrying means and yoke means 30. Object-carrying means 20 is preferably lifted by lift portion 102 of hoist means 12 to a height to where at the attached yoke means 30 is a convenient height with respect to the body of the user. In such a manner, the user may easily lift upon harness 312 of yoke means 30 to thus transport the loaded object-carrying means. In preferred embodiments, yoke means 30 further includes a detachable strap, which strap is wrappable around the users midsection during use.

Upon reaching a desired destination, the user preferably activates first actuation means 330 to extend support legs 340 to the ground or floor surface. Such biased support leg 340 thus support a large degree of payload upon object-carrying means 20. Preferably, the user then activates second actuation means 332 to lower object-carrying means 20 with respect to yoke means 30, thereby placing object-carrying means 20 at or near the ground or floor surface. The payload may then be removed from object-carrying means 20 at the desired location.

The materials and features described herein with regard to the present invention are selected for portability characteristics. Thus, lightweight, but strong materials are preferably utilized in the manufacture of the present invention. It is a particular advantage of the present invention to provide a self-contained assembly of distinct components which assist a user in transporting various articles over uneven ground or floor surfaces.

The invention has been described herein in considerable detail in to comply with the Patent Statutes, and to provide those skilled in the art with the information needed to apply the novel principles and to construct and use embodiments of the invention as required. However, it is to be understood that the invention can be carried out by specifically different devices and that various modifications can be accomplished without departing from the scope of the invention itself.

What is claimed is:

1. A multiple component system for manually transporting objects, comprising:
   a) a movable object-carrying means;
   b) a hoist means for lifting and lowering said object-carrying means to desired heights; and
   c) a yoke means specifically configured for removable attachment to said object-carrying means, said yoke means comprising a distinct user-wearable device being configured to be efficiently carried by a user such that objects held on said removably attached object-carrying means may be easily transported over various ground and floor surfaces.

2. A system as in claim 1 wherein said object-carrying means, said hoist means, and said yoke means are distinct components.

3. A system as in claim 1 wherein said object-carrying means, said hoist means, and said yoke means, in combination, are sufficiently lightweight and compactable to be stowed together within a single hand-carryable container.

4. A system as in claim 1 wherein said object-carrying means includes an upright frame having an upper portion and a lower portion, said lower portion having a support shelf pivotally mounted thereto such that said support shelf may pivot 90 degrees between a parallel and a perpendicular orientation with respect to said frame, said lower portion of said frame including one or more movement facilitators rotatably secured thereto for facilitating movement of said object-carrying means.

5. A system as in claim 4 wherein one of said upper portion and said lower portion may be telescopingly received in another of said upper portion and said lower portion such that a respective height dimension of said object-carrying means may be correspondingly adjusted.

6. A system as in claim 4 wherein said movement facilitators are pivotally secured to said lower portion of said frame to thereby pivot between an extended active orientation and a retracted inactive orientation.

7. A system as in claim 4 wherein an upper surface of said support shelf in said parallel orientation is substantially propinquant to said frame.

8. A system as in claim 4 wherein said frame includes one or more strap connection brackets for removably mounting a payload securing strap thereto.

9. A system as in claim 1 wherein an upper surface of said hoist means comprises a lift portion and a stationary portion, said stationary portion remaining substantially adjacent to a respective ground or floor surface upon which said hoist means rests.

10. A system as in claim 9 wherein a ratcheted foot lever actuates a pantographic lift system to raise said lift portion of said hoist means.

11. A system as in claim 10 wherein said foot lever is actuated by a user positioned on said stationary portion of said hoist means.

12. A system as in claim 10, including a lift system release mechanism to retract said pantographic lift system, thereby lowering said lift portion of said hoist means.

13. A system as in claim 12 wherein said release mechanism may be actuated by a foot of a user positioned on said stationary portion of said hoist means.

14. A system as in claim 9, including pivotable ramp portions extending from said stationary portions to said ground or floor surface such that said object-carrying means may be efficiently transported between said hoist means and said ground or floor surface.

15. A system as in claim 1 wherein said yoke means is slidably and lockingly engagable with said object-carrying means.

16. A system as in claim 15, including yoke handles pivotally connected to a frame portion of said yoke means, said yoke handles being configured to be supported by respective shoulders of a user when said yoke handles are pivotally extended outwardly from said yoke frame portion.

17. A system as in claim 16 wherein said yoke handles pivot no more than 90 degrees outwardly from said yoke frame portion.

18. A system as in claim 16, including retractable support legs extendable downwardly from said yoke means, said legs being extendable from a locked retracted position to an unlocked extended position.

19. A system as in claim 18 wherein said yoke means include second biasing means to bias said support legs toward said extended position.

20. A system as in claim 19 wherein said yoke handles include second actuating means for actuatably releasing said support legs from said locked retracted position, thereby allowing said second biasing means to extend said support legs to said extended position.

21. A system as in claim 15, including a first biasing means biasing against said sliding and locking engagement between said yoke means and said object-carrying means.

22. A system as in claim 21, including first actuating means for actuatably releasing said object-carrying means from said locking engagement with said yoke means, thereby allowing said first biasing means to slidably extend said object-carrying means downwardly with respect to said yoke means from a stowage position to engagement/ disengagement position.

23. A portable apparatus forming a multiple component system for facilitating a user in transporting articles, comprising:
(a) a user-wearable, article-carrying means having a frame and grasping handles pivotally connected to said frame, said handles being configured to be placed over respective shoulders of the user such that said frame may be supported by respective shoulders of the user whereby said frame may be carried with various articles held thereon; and
(b) a hoist means for lifting and lowering said article-carrying means to desired heights such that said handles may be pivoted and conveniently placed over respective shoulders of the user, an upper surface of said hoist means including a lift portion and a stationary portion adjacent to said lift portion, and a ratcheted lift lever accessible to a user when the user is standing upon said stationary portion, said lift lever being operably connected to a lift system of said hoist means for operably lifting said lift portion, said article carrying means and said hoist means, in combination, being sufficiently lightweight and compactable to be stowed and transported within a hand-carryable container.

24. A portable apparatus as in claim 23 wherein said frame of said article-carrying means includes an upper portion and a lower portion, said lower portion having a support shelf pivotally mounted thereto such that said support shelf may pivot 90 degrees between a parallel and perpendicular orientation with respect to said frame, said lower portion of said frame including one or more wheels rotatably secured thereto.

25. A portable apparatus as in claim 24 wherein said upper portion of said frame may be telescopingly received in said lower portion such that a respective height dimension of said article-carrying means may be correspondingly adjusted.

26. A portable apparatus as in claim 24 wherein said wheels are pivotally secured to said lower portion of said frame to thereby pivot between an extended active orientation and a retracted inactive orientation.

27. A portable apparatus as in claim 24 wherein said handles include a first actuation means which may be activated by a user to lower said support shelf to desired levels.

28. A portable apparatus as in claim 23, including ramp portions pivotally connected to said hoist means, which ramp portions pivotally extend to an open position whereby respective distal edges of said ramp portion are in contact with a ground or floor surface, thereby providing a continuous surface between the ground and floor surface of said hoist means.

29. A portable apparatus as in claim 23 wherein said ratcheted lift lever may be conveniently operated by a foot of the user while the user is positioned upon said stationary portion of said hoist means.

30. A portable apparatus as in claim 23 wherein said lift system is a pantographic lift system.

31. A portable apparatus as in claim 29, including a lift system release mechanism to retract said lift system, thereby lowering said lift portion of said hoist means.

32. A portable apparatus as in claim 31 wherein said release mechanism may be actuated by a foot of a user positioned upon said stationary portion of said hoist means.

33. A portable apparatus as in claim 23, including remotely extendable support legs which are extendable downwardly from said article-carrying means.

34. A portable apparatus as in claim 33, including biasing means for biasing said support legs toward an extended position.

35. A portable apparatus as in claim 34, including a second actuation means which may be activated by the user to allow said biasing means to extend said support legs to the extended position.

36. A portable hoist means for raising and lowering articles to desired levels, comprising:
   (a) a lift portion;
   (b) a stationary portion substantially adjacent to said lift portion;
   (c) one or more ramp portions pivotally connected to said hoist means, said ramp portions being pivotally extendable to extend between an upper surface of said hoist means and a respective ground or floor surface upon which said hoist means rests, said ramp portions further being pivotally retractable such that said hoist means is sufficiently compactable to be conveniently stowed and transported in a hand-carryable container; and
   (d) a lift system operably connected to said lift portion, said lift system including means for operably raising and lowering said lift portion to desired levels.

37. A portable hoist means as in claim 36 wherein said lift system is a pantographic lift system.

38. A portable hoist means as in claim 36, including a ratcheted lift lever operably connected to said lift system.

39. A portable hoist means as in claim 38 wherein said lift lever may be conveniently operated by a foot of a user positioned upon said stationary portion.

40. A portable hoist means as in claim 39, including a lift system release mechanism to retract said lift system, thereby lowering said lift portion of said hoist means.

41. A portable hoist means as in claim 40 wherein said release mechanism may be actuated by a foot of a user positioned upon said stationary portion of said hoist means.

42. A portable article transporting device, comprising:
   (a) an elongated frame;
   (b) a plurality of extendable support legs extendable outwardly from said frame;
   (c) a biasing means being braced against said frame; and
   (d) a support harness pivotally connected to said frame, said harness including a plurality of grasping handles which grasping handles include a first actuation means for remotely actuating said extendable support legs by remotely releasing said biasing means to operably extend said support legs.

43. A portable device as in claim 42 wherein said support harness is configured to be supported by a user, whereby said grasping handles are supported by respective shoulders of the user.

44. A device as in claim 43 wherein said frame is adapted to be removably attachable to common hand trucks.

45. A method of manually transporting articles, comprising:
   (a) providing a movable article-carrying means, a hoist means for lifting and lowering means said article-carrying means to desired heights, and a yoke means for removable attachment to said article-carrying means, said yoke means comprising a user-wearable device being configured to be efficiently carried by the user such that articles held on said removably attached article-carrying means may be easily transported over various ground and floor surfaces;
   (b) placing said hoist means on a relatively flat surface;
   (c) loading articles upon a support shelf of said article-carrying means;
   (d) maneuvering said loaded article-carrying means onto a lift portion of said hoist means;
   (e) actuating said lift means via a ratcheted lift lever, which lift lever is accessible to a user standing upon a stationary portion of said hoist means;
   (f) removably attach said yoke means to said article-carrying means;
   (g) lifting said yoke means and said removably attached article-carrying means, and transporting the combination yoke means/article-carrying to a desired location;
   (h) activating a first actuation means on said yoke means, such that biased extendable legs extend downwardly from said yoke means to a ground or floor surface;
   (i) activating a second actuation means on said yoke means, such that said article-carrying means is lowered to the ground or floor surface; and
   (j) removing the articles from said article-carrying means at the desired location.

46. A method as in claim 45 wherein said article-carrying means, said hoist means, and said yoke means, in combination, may be stowed and transported in a hand-carryable container.

47. A method as in claim 45 wherein said article-carrying means is a common hand truck.

48. A method as in claim 45 wherein said article-carrying means, said hoist means, and said yoke means are distinct components.

49. A method as in claim 45 wherein said actuation means are disposed on grasping handles pivotally connected to said yoke means.

* * * * *